Patented Feb. 9, 1954

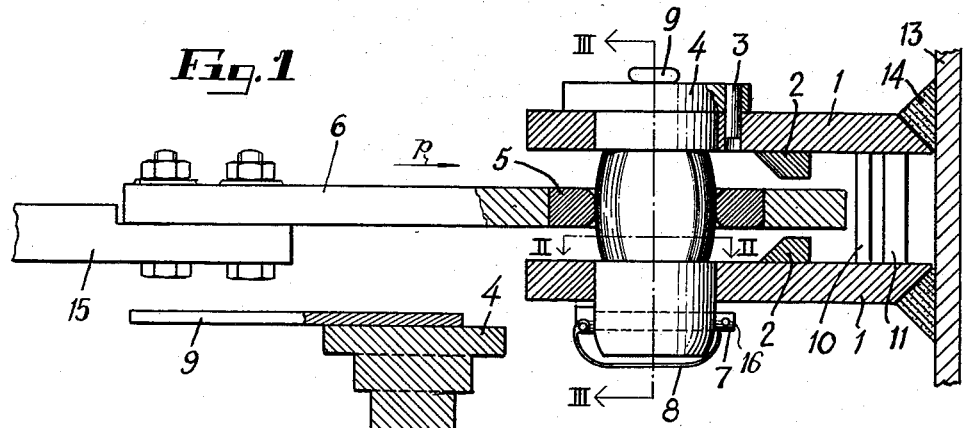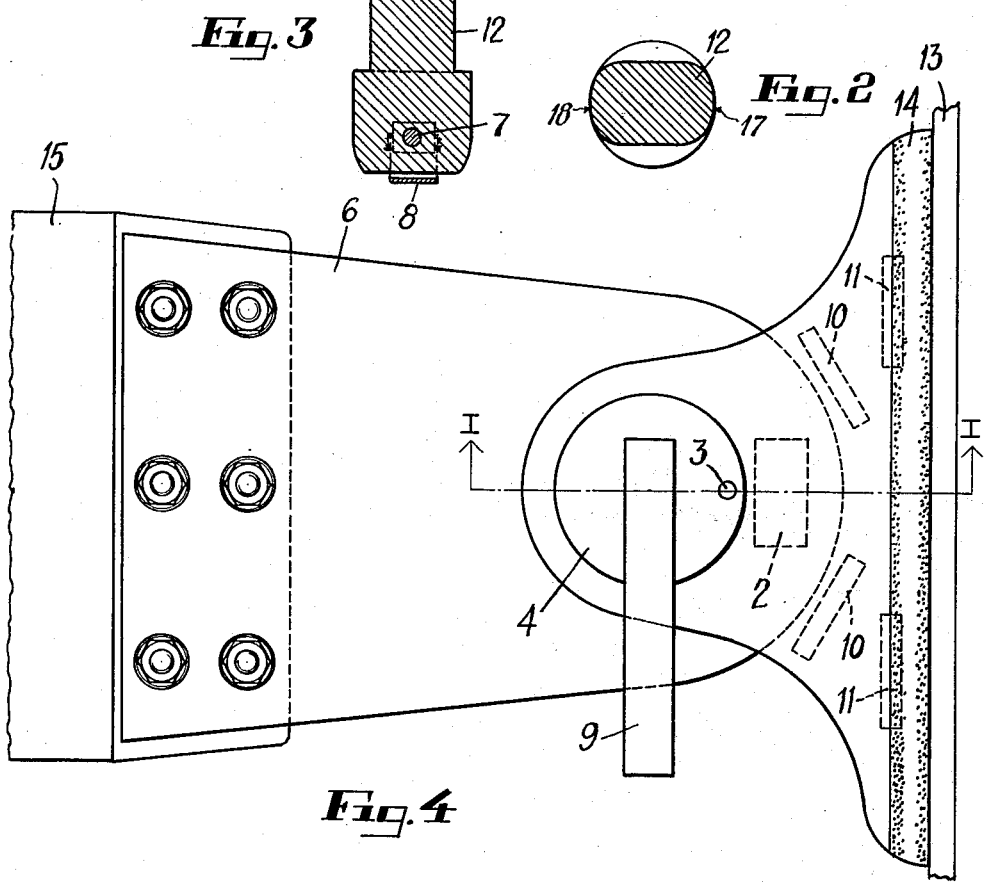

2,668,723

UNITED STATES PATENT OFFICE 2,668,723

COUPLING FOR TRAILER VEHICLES

Herman Ulrik Krefting, Vanersborg, Sweden

Application January 2, 1952, Serial No. 264,420

Claims priority, application Sweden
January 8, 1951

2 Claims. (Cl. 280—515)

This invention relates to a coupling comprising a coupling member connected to a motor vehicle and another coupling member connected to a trailer vehicle, one of said coupling members being bifurcated so as to comprise two substantially horizontal branches, and a substantially vertical pivot mounted in said branches, the other coupling member extending partly between said branches and having an opening receiving said pivot. The invention has for its object to provide an improved coupling of this type that will permit great movability without being subject to excessive shock and wear. I attain this object by mechanism illustrated in the annexed drawing, in which:

Fig. 1 is a vertical sectional view of the coupling; Figs. 2 and 3 are sections through the pivot of the coupling on the line II—II and III—III, respectively, Fig. 1; and Fig. 4 is a plan view of the coupling.

Referring to the drawing, numeral 1 denotes a bifurcated coupling member the branches of which are interconnected by vertical connecting pieces 11 and centering members 10. The centering members 10 are located obliquely in a manner such that their faces directed towards the open end of the coupling member 1 make acute angles with the longitudinal axis of said coupling member. By suitable means, such as welded joints 14, the coupling member 1 is secured to one of the vehicles, for instance to the motor vehicle which in the drawing is merely represented by a frame portion 13. The direction of the force acting on the coupling is indicated at p.

The other coupling member 6 consists of a plate which by means of bolts, rivets or welded joints is secured to a connecting rod 15 suitably attached to the trailer vehicle. At its front end, the coupling member 6 is circularly rounded for cooperation with the centering members 10.

The coupling members 1 and 6 have openings to receive a coupling pivot 4. The openings are circular, and the pivot 4 has cylindrical end portions which are mounted in the openings of the branches. The pivot is prevented from turning movement by means of a locking pin 3 and is held in position by a pin 7 which is secured in place by a resilient member 8 pivoted to one end of the pin 7 and engaging a stud 16 at the other end thereof. The pivot 4 is provided with a handle 9 attached to the upper side of the pivot.

As will be seen from Figs. 2 and 3, the portion 12 of the pivot 4 which is located between the branches of the coupling member 1 and engages the other coupling member 6, is elongated in cross-section with the long axis extending in the direction p of the force acting upon the coupling. In horizontal cross-section, the central portion of the pivot 4 is substantially that of a circle complementary to the circular opening in the coupling member 6, but with equal segments removed from the sides of the circle, whereby clearances are provided between the lateral portions of the pivot and the opening of the coupling member 6.

The front and rear faces 17 and 18, respectively, of the pivot portion 12 are convex as viewed in Fig. 1, whereby to have the pivot closely engage its opening in the direction of force in different inclined positions.

Between the branches of the coupling member 1 and the other coupling member 6 there are provided abutting members 2 which according to the embodiment exemplified are mounted on the branches. These abutments guide the coupling members 6 in such a manner that vertical swinging movements of the coupling members relative to each other will take place about a point located substantially midway between the branches of the coupling member 1.

The face 18 of the pivot 4 as viewed in Fig. 1 is defined by a circular arc having its center located midway between the abutments 2. In order to secure proper engagement between the pivot portion 12 and the coupling member 6, it is obviously not necessary to have the other face 17 shaped in the same manner as the face 18, nor is it necessary to have the face 17 shaped along a circular arc. Generally, the shape of the pivot portion 12 may be defined such that the length of the long axis of the cross-section of the portion 12 decreases upwardly and downwardly from the central part thereof.

Alternatively, the abutments 2 may be provided on the left hand side of the pivot 4, as viewed in Fig. 1. In this case the face 17 should have the shape indicated above for the face 18. Preferably, both faces 17 and 18 are given equal shapes.

From Fig. 2 it will appear that the front end as well as the rear end of the pivot portion 12 is convex as viewed in a horizontal section.

The circular opening in the coupling member 6 is provided in an exchangeable ring 5 of a suitable hard material. In cross-section, said opening may have straight sides or the sides may be rounded outwardly or inwardly from the center of the opening.

The coupling described permits great movability in the connection between the motor vehicle and the trailer vehicle both in vertical and horizontal directions. Due to the close engagement between the coupling pivot and the opening of the coupling member 6 and due to the shape of the pivot, shocks are prevented in the coupling during acceleration and retardation of the vehicle, such as at the start and braking thereof.

What I claim is:

1. A coupling for connecting a trailer vehicle to a motor vehicle, comprising a first coupling member connected to one of said vehicles, a second coupling member connected to the other vehicle, said first coupling member being bifurcated so as to comprise two vertically spaced and substantially horizontal branches, and a substantially vertical pivot mounted in said branches, said second coupling member extending partly between said branches and being of less vertical thickness than the spacing of said branches, said second coupling member being provided with a circular opening receiving said pivot, the portion of said pivot located between said branches being elongated in cross-section with the long axis extending in the direction of the force acting upon the coupling, the length of the long axis of said cross-section decreasing upwardly and downwardly from the central part of said pivot portion.

2. A coupling for connecting a trailer vehicle to a motor vehicle, comprising a first coupling member connected to one of said vehicles, a second coupling member connected to the other vehicle, said first coupling member being bifurcated so as to comprise two vertically spaced and substantially horizontal branches, and a substantially vertical pivot mounted in said branches, said second coupling member extending partly between said branches and being of less vertical thickness than the spacing of said branches, said second coupling member being provided with a circular opening receiving said pivot, the portion of said pivot located between said branches being elongated in cross-section with the long axis extending in the direction of the force acting upon the coupling, at least one of the front and rear faces of said pivot portion being convex as viewed both in vertical and horizontal section, the curvature of the front and rear faces of the pivot as viewed in horizontal section at the central portion thereof being substantially complementary to the curvature of the opening in said second coupling member.

HERMAN ULRIK KREFTING.

References Cited in the file of this patent

UNITED STATES PATENTS

| Number | Name | Date |
|---|---|---|
| 2,002,922 | Onken | May 28, 1935 |
| 2,431,694 | Johnson | Dec. 2, 1947 |
| 2,593,453 | Honeycutt et al. | Apr. 22, 1952 |

FOREIGN PATENTS

| Number | Country | Date |
|---|---|---|
| 105,011 | Great Britain | Mar. 29, 1917 |